(12) United States Patent
Danisch et al.

(10) Patent No.: US 6,336,942 B1
(45) Date of Patent: *Jan. 8, 2002

(54) PROCESSES OF TREATING LEATHER AND SKINS EMPLOYING POLYMER COMPOSITIONS

(75) Inventors: Peter Danisch, Ludwigshafen; Johannes Peter Dix, Weisenheim; Walter Denzinger, Speyer; Axel Kistenmacher; Michael Kneip, both of Ludwigshafen; Hans-Joachim Müller, Grünstadt; Joachim Rösch, Ludwigshafen; Gunnar Schornick, Neuleiningen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/913,104

(22) PCT Filed: Mar. 4, 1996

(86) PCT No.: PCT/EP96/00900

§ 371 Date: Sep. 15, 1997

§ 102(e) Date: Sep. 15, 1997

(87) PCT Pub. No.: WO96/28483

PCT Pub. Date: Sep. 19, 1996

(30) Foreign Application Priority Data

Mar. 12, 1995 (DE) .......................... 195 08 655

(51) Int. Cl.⁷ .............................. C14C 9/02; C14C 3/22; C14C 11/00
(52) U.S. Cl. ......................... 8/94.21; 8/94.33; 427/389
(58) Field of Search ....................... 516/69, 73; 8/94.22, 8/94.23, 94.21, 94.33; 526/272, 318.25; 525/285; 427/389

(56) References Cited

U.S. PATENT DOCUMENTS

| 2,634,256 A | * | 4/1953 | Sparks et al. ............... 525/285 |
| 2,969,345 A | * | 1/1961 | Coover, Jr. et al. ......... 526/139 |
| 3,433,777 A | * | 3/1969 | Brunson .................... 525/285 |
| 3,480,580 A | * | 11/1969 | Joyner et al. .............. 525/263 |
| 3,481,910 A | * | 12/1969 | Brunson .................... 525/285 |
| 4,212,783 A | * | 7/1980 | Sata et al. ................ 526/272 |
| 4,250,289 A | * | 2/1981 | Denzinger et al. .......... 526/272 |
| 4,514,544 A | * | 4/1985 | Takahashi et al. .......... 526/272 |
| 5,279,613 A | * | 1/1994 | Schaffer et al. ............ 8/94.21 |
| 5,286,263 A | * | 2/1994 | Schaffer et al. ............ 8/94.33 |
| 5,534,604 A | * | 7/1996 | Bildhauer et al. .......... 526/253 |
| 5,575,939 A | * | 11/1996 | Dahmen et al. ............. 8/94.22 |
| 6,200,640 B1 | * | 3/2001 | Kneip et al. ............... 427/389 |

FOREIGN PATENT DOCUMENTS

| DE | 26 29 748 | 7/1976 |
| DE | 43 30971 | 9/1993 |
| EP | 0 579 267 | 11/1989 |
| EP | 0 412 389 | 7/1990 |
| EP | 0 486 608 | 8/1990 |
| EP | 0 682 044 | 11/1995 |
| RO | 54317 | 8/1972 |
| WO | WO 90/03359 | 4/1990 |

OTHER PUBLICATIONS

Encyclopedia of Polymer Science and Engineering vol. 4 (John Wiley & Sons, NY, NY, 1986) p. 192, Jul. 1986.*

Kirk–Othmer Encyclopedia of Chemical Technology Fourth Edition vol. 7 (John Wiley & Sons, NY, NY, 1994) pp. 364–365, Feb. 1994.*

K. F. O'Driscoll, The Nature and Chemistry of High Polymers (Reinhold Publishing Corp., NY, NY, 1964) pp. 22–43, Month unknown, 1964.*

Hawley's Condensed Chemical Disctionary, 11th ED., (Van Nostrand Reinhold Co., NY, NY, 1988), p. 300, Oct. 1989.*

* cited by examiner

Primary Examiner—Daniel S. Metzmaier
(74) Attorney, Agent, or Firm—Oblon, Spivak, McClelland, Maier & Neustadt, P.C.

(57) ABSTRACT

Aqueous solutions or aqueous emulsions of copolymers are obtainable by copolymerization of (a) from 20 to 95 mol % of at least one monoethylenically unsaturated $C_4$–$C_{12}$-dicarboxylic acid or the anhydride thereof with (b) from 5 to 80 mol % of at least one branched oligomer or polymer which has a vinyl, vinylidene or alkylvinylene terminal group and is of at least 9 carbon atoms and (c) from 0 to 50 mol % of at least one further monoethylenically unsaturated compound which is copolymerizable with the monomers (a) and (b)

and contain from 0.5 to 70% by weight, based on the total amount of the solutions or emulsions, of these copolymers. These copolymer solutions or emulsions are suitable as leather assistants and as dispersants for pigments.

4 Claims, No Drawings

PROCESSES OF TREATING LEATHER AND SKINS EMPLOYING POLYMER COMPOSITIONS

This application is filed under 35 U.S.C. §371 and is based on PCT/EP96/00900, filed Mar. 4, 1996.

BACKGROUND OF THE INVENTION

1. Field of the Invention

The present invention relates to aqueous solutions or emulsions of copolymers of monoethylenically unsaturated dicarboxylic acids or the anhydrides thereof and branched oligomers or polymers and the use of these solutions or emulsions as leather assistants and dispersants for pigments. Since some of the copolymers described are novel substances, the present invention furthermore relates to these copolymers.

2. Description of the Background

German Patent 2,629,748 (1) discloses the use of copolymers of linear $C_{10}$–$C_{30}$-olefins and maleic anhydride, which copolymers have been hydrolyzed with alkali metal bases or amines, for plumping and fatliquoring leather and skins. The hydrolyzed copolymers can also be reacted with alkali metal bisulfite. Since the copolymers are prepared in organic solvents and the solvents are not removed, the aqueous copolymer emulsions prepared therefrom contain considerable amounts of organic solvents, for example xylene or dodecylbenzene. Although such emulsions are recommended for fatliquoring leather and skins, their content of organic solvents makes them virtually useless for leather production.

EP-A 412 389 (2) discloses the use of aqueous solutions or emulsions of partially neutralized copolymers of maleic anhydride with $C_8$–$C_{40}$-olefins for rendering leathers and skins water repellent. Examples of olefin components are oct-1-ene, diisobutene, dec-1-ene, dodec-1-ene, tetradec-1-ene, hexadec-1-ene and cyclooctene.

EP-A 486 608 (3) discloses the use of copolymers based on long-chain alkyl vinyl ethers and ethylenically unsaturated dicarboxylic anhydrides for rendering leather and skins water repellent.

EP-A 579 267 (4) discloses emulsions of water-insoluble amphiphilic copolymers, for example based on primary alkenes and maleic anhydride, which can be used for the treatment of tanned leather.

When used in practice, the prior art polymeric assistants for the water repellent treatment and also for the fatliquoring and retanning of leather often have the serious disadvantage that they penetrate only into those layers of the leather which are close to the surface. The insufficient penetration of these polymeric assistants through the leather cross-section results in the leathers produced therewith frequently having deficiencies with regard to the achievable body, softness, color depth and water repellency. Thus, water can penetrate substantially unhindered at cut edges, seams and tears and in areas of mechanically caused surface damage.

SUMMARY OF THE INVENTION

It is an object of the present invention to provide suitable polymer-based compositions which permit good penetration through the leather cross-section.

We have found that this object is achieved by aqueous solutions or aqueous emulsions of copolymers, which are obtainable by copolymerization of (a) from 20 to 95 mol % of at least one monoethylenically unsaturated $C_4$–$C_{12}$-dicarboxylic acid or the anhydride thereof with (b) from 5 to 80 mol % of at least one branched oligomer or polymer which has a vinyl, vinylidene or alkylvinylene terminal group and is of at least 9 carbon atoms and (c) from 0 to 50 mol % of at least one further monoethylenically unsaturated compound which is copolymerizable with the monomers (a) and (b).

DETAILED DESCRIPTION OF THE INVENTION

The stated copolymers are used as aqueous solutions or aqueous emulsions containing usually from 0.5 to 70, in particular from 1 to 60, preferably from 3 to 35, % by weight, based on the total amount of the solutions or emulsions, of these copolymers in untreated or in solvolyzed and/or neutralized form (solids content).

Some of the copolymers on which the novel aqueous solutions or aqueous emulsions are based are known in principle, for example from WO-A 90/03359 (5) and German Patent Application P 43 30 971.2 (6); there, however, the copolymers are recommended in oil-soluble form as fuel and lubricant additives.

Some or all of the anhydride groups present in the copolymer can be solvolyzed with compounds containing hydroxyl functional groups or with amines. The untreated polymers or polymers solvolyzed, ie. esterified, amidated or imidated, with alcohols or amines are, as a rule, then subjected in the aqueous medium to at least partial neutralization at the carboxyl groups which are present or which are formed in the solvolysis. The solution or emulsion obtained can be used mainly as a retanning agent, a fat-liquor or a water repellent for leather.

The aqueous solutions or emulsions can also be prepared using up to 40%, based on the amount of copolymer, of emulsifiers or protective colloids or said emulsifiers or protective colloids may be added to them after their preparation. This results in excellent fatliquoring and retanning properties for leather in combination with good penetration.

Suitable monomers (a) are monoethylenically unsaturated carboxylic acids and their anhydrides of 4 to 12, in particular 4 to 6, carbon atoms, especially maleic acid, itaconic acid, citraconic acid, mesaconic acid, fumaric acid, maleic anhydride, itaconic anhydride, citraconic anhydride, methylenemalonic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]oct-5-ene-2,3-dicarboxylic anhydride, 3-methyl-1,2,6-tetrahydrophthalic anhydride and 2-methyl-1,3,6-tetrahydrophthalic anhydride and mixtures of these with one another. Maleic anhydride is preferred.

Suitable monomers (b) are branched oligomers or polymers of 9 to, usually, 350, preferably 10 to 140, in particular 11 to 70, especially 12 to 30, carbon atoms, which are prepared by oligomerization or polymerization of linear or branched olefins or olefin mixtures and contain a copolymerizable terminal group in the form of a vinyl, vinylidene or alkylvinylene group. These terminal groups can be characterized by the following general formulae:

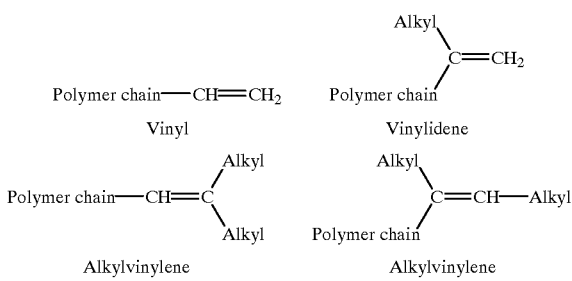

Branched means that the oligomer or polymer chain carries alkyl side chains, in particular $C_1$–$C_{40}$-alkyl side chains, especially $C_1$–$C_{24}$-alkyl side chains, very particularly preferably methyl and $C_5$–$C_{16}$-alkyl side chains at more or less regular intervals. As a rule, there are from 0.3 to 8, in particular from 0.7 to 6, especially from 1 to 5, alkyl side chains per 10 carbon atoms in the main chain, and 1 carbon atom in the main chain may carry one or two alkyl side chains.

Examples of suitable linear or branched olefins or olefin mixtures for the preparation of the monomers (b) are propene, but-1-ene, isobutene, hex-1-ene, 2,4,4-trimethylpent-1-ene, 2,4,4-trimethylpent-2-ene, $C_8$–$C_{10}$-α-olefin, dodec-1-ene, $C_{12}$–$C_{14}$-α-olefin, 1-tetradecene, 1-hexadecene, 1-octadecene, $C_{20}$-α-olefin, $C_{22}$-α-olefin, $C_{24}$-α-olefin and a mixture of $C_{20}$–$C_{24}$-α-olefin, $C_{24}$–$C_{28}$-α-olefin, $C_{30}$-α-olefin or $C_{40}$-α-olefin. Mixtures of ethene as a component with the mixture may also be used, for example an ethene/butene mixture or an ethene/hexene mixture. Functionalized olefins which carry, for example, amino, hydroxyl, carboxyl or ester groups, aryl radicals, further C—C double bonds or cyclic saturated or unsaturated alkyl radicals may also be used, alone or as a mixture, for the preparation of tbe branched oligomers or polymers (b).

Examples of branched oligomers or polymers (b) are oligopropene, oligohexene, oligo(hexene/ethene), oligooctadecene and polyisobutene, for example polyisobutene having a number average molecular weight of 1000, 1300 or 2300.

The branched oligomers or polymers (b) can as a rule be prepared from the stated starting olefins by conventional polymerization methods using metal complexes, for example metallocene complexes, as catalysts or by means of known cationic polymerization methods.

Suitable monomers (c) are all those monomers which are copolymerizable with monomers (a) and (b).

These are, for example, linear 1-olefins (α-olefins) of 2 to 40, preferably 8 to 30, carbon atoms, such as decene, dodecene, octadecene and industrial mixtures of $C_{20}$–$C_{24}$-olefins and $C_{24}$–$C_{28}$-olefins. Functionalized 1-olefins eg. 10-undecenoic acid, are also suitable.

Other suitable monomers (c) are monoethylenically unsaturated $C_3$–$C_{10}$-monocarboxylic acids, such as acrylic acid, methacrylic acid, dimethylacrylic acid, ethylacrylic acid, crotonic acid, allylacetic acid and vinylacetic acid, among which acrylic acid and methacrylic acid are preferred. Vinyl and allyl alkyl ethers where the alkyl radical is of 1 to 40 carbon atoms are also suitable as monomers (c), and the alkyl radical may also carry further substituents, such as hydroxyl, amino or dialkylamino or one or more alkoxylate groups. Examples are methyl vinyl ether, ethyl vinyl ether, propyl vinyl ether, isobutyl vinyl ether, 2-ethylhexyl vinyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and the corresponding allyl ethers.

A further group of monomers (c) comprises $C_1$–$C_{40}$-alkyl esters, hydroxyalkyl esters, alkoxyalkyl esters, amides and $C_1$–$C_{40}$-N-alkylamides of monoethylenically unsaturated $C_3$–$C_{10}$-mono- or dicarboxylic acids, such as ethyl acrylate, butyl acrylate, 2-ethylhexyl acrylate, decyl acrylat, dodecyl acrylate, octadecyl acrylate and the esters of industrial alcohol mixtures of 14 to 28 carbon atoms, ethyl methacrylate, phenoxyethyl acrylate, methyldiglycol acrylate, 2-ethylhexyl methacrylate, decyl methacrylate, octadecyl methacrylate, monobutyl maleate, dibutyl maleate, monodecyl maleate, didodecyl maleate, monooctadecyl maleate, dioctadecyl maleate, hydroxyethyl acrylate, hydroxypropyl acrylate, butane-1,4-diol monoacrylate, dimethylaminoethyl acrylate, diethylaminoethyl acrylate, dibutylaminoethyl methacrylate, acrylamide, methacrylamide, N-tert-butylacrylamide, N-octylacrylamide, N,N'-dibutylacrylamide, N-dodecylmethacrylamide, N-octadecylmethacrylamide and dimethylaminopropylmethacrylamide.

Vinyl and allyl esters of $C_1$–$C_{30}$-monocarboxylic acids may also be copolymerized as monomers (c) with the monomers (a) and (b). These are specifically, for example, vinyl formate, vinyl acetate, vinyl propionate, vinyl butyrate, vinyl laurate, vinyl stearate, vinyl pivalate, allyl acetate, allyl butyrate and allyl stearate.

N-Vinylcarboxamides of carboxylic acids of 1 to 8 carbon atoms, such as N-vinyl formamide, N-vinyl-N-methylformamide, N-vinylacetamide, N-vinyl-N-methylacetamide, N-vinyl-N-ethylacetamide, N-vinyl-N-methylpropionamide and N-vinylpropionamide are also suitable as monomers (c). N-Vinyl compounds of nitrogen-containing heterocycles, such as N-vinylimidazole, N-vinylmethylimidazole, N-vinylpyrrolidone and N-vinylcaprolactam, are further examples here.

Styrene and the derivatives derived therefrom, such as α-methylstyrene, 3-methylstyrene or 4-methylstyrene, are furthermore suitable as monomers (c).

Mixtures of the monomers stated under (c) are also suitable for the novel copolymers.

Acrylic acid, methacrylic acid, $C_{16}$-α-olefin, $C_{20}$–$C_{24}$-α-olefin, $C_{14}$–$C_{20}$-alkyl vinyl ethers, $C_{14}$–$C_{20}$-alkyl esters of monoethylenically unsaturated $C_3$–$C_6$-mono- and dicarboxylic acids and styrene are preferred among these monomers (c).

The copolymers contain the monomers (a) to (c) preferably in amounts of from 35 to 70, in particular from 45 to 60, mol % of monomer (a), from 30 to 65, in particular from 40 to 55, mol % of monomer (b) and from 0 to 30, in particular from 0 to 10, especially from 0 to 5, mol % of monomer (c).

The copolymers can be prepared by all known conventional polymerization methods, for example by mass, emulsion, suspension, precipitation and solution polymerization. All stated polymerization methods are carried out in the absence of oxygen, preferably in a nitrogen stream. The usual apparatuses, for example autoclaves and kettles, are used for all polymerization methods. Mass polymerization of the monomers of the groups (a) to (c) is particularly preferred. It may be carried out at from 80 to 300° C., preferably from 100 to 200° C., the lowest polymerization temperature to be chosen preferably being at least about 20° C. above the glass transition temperature of the polymer formed. The polymerization conditions are chosen according to the molecular weight which the copolymers are to have. Polymerization at high temperatures gives copolymers having low molecular weights, whereas polymers having high molecular weights are formed at low polymerization temperatures.

The copolymerization is preferably carried out by a free radical method, ie. in the presence of compounds forming free radicals. Up to 10, preferably from 0.2 to 5, % by weight, based on the monomers used in the copolymerization, of these compounds are required. Examples of suitable polymerization initiators are peroxide compounds, such as tert-butyl perpivalate, tert-butyl perneodecanoate, tert-butyl perethylhexanoate, tert-butyl perisobutyrate, di-tert-butyl peroxide, di-tert-amyl peroxide, diacetyl peroxydicarbonate and dicyclohexyl peroxydicarbonate, and azo compounds, such as 2,2'-azobisisobutyronitrile. The initiators can be used alone or as a mixture with one another.

In the mass polymerization, the polymerization initiators are introduced into the polymerization reactor preferably separately or as a solution in suitable solvent or in the form of a solution or as a dispersion in the monomers (b) or (c). In the case of the copolymerization, it is of course also possible concomitantly to use redox coinitiators, for example benzoin, dimethylaniline, ascorbic acid and complexes of heavy metals, such as copper, cobalt, iron, manganese, nickel and chromium, which complexes are soluble in organic solvents. The concomitant use of redox coinitiators allows the polymerization to be carried out at a lower temperature. The redox coinitiators are usually used in amounts of from about 0.1 to 1000 ppm, based on the amounts of monomers used. If the monomer mixture undergoes initial polymerization at the lower limit of the temperature range which is suitable for the polymerization and then undergoes complete polymerization at a higher temperature, it is advantageous to use at least two different initiators which decompose at different temperatures so that a sufficient concentration of free radicals is available in each temperature range.

In order to prepare low molecular weight polymers, it is often advantageous to carry out the copolymerization in the presence of regulators. Conventional regulators, such as $C_1$–$C_4$-aldehydes, formic acid and organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, may be used for this purpose. The polymerization regulators are generally used in amounts of from 0.1 to 10% by weight, based on the monomers.

In order to prepare copolymers having a higher molecular weight, it is often advantageous to carry out the polymerization in the presence of chain extenders. Such chain extenders are compounds having di- or polyethylenically unsaturated groups, such as divinylbenzene, pentaerythrityl triallyl ether, esters of glycols, such as glycol diacrylate, glyceryl triacrylate and polyethylene glycol diacrylates. They may be added in the polymerization in amounts of up to 5% by weight.

The novel copolymers generally have weight average molecular weights of from 800 to 50,000. Copolymers having number average molecular weights of from 1000 to 20,000 are preferred.

The copolymerization can be carried out continuously or batchwise. For example, the branched olefin (b) or a mixture of different olefins (b) may be initially taken in the reactor and heated to the desired polymerization temperature while stirring. As soon as the olefin has reached the polymerization temperature, the further comonomers are metered in. If an initiator is used, it is metered into the reaction mixture preferably separately or in solution in a monomer used for the polymerization or in a suitable solvent. Where it is used, the polymerization regulator is added to the polymerizing mixture either separately or likewise in solution in a monomer. The anhydrides (a) and in particular maleic anhydride, are preferably added in the form of a melt to the reaction mixture. The temperature of this melt is from about 70 to 90° C. The copolymerization melt is then advantageously further processed.

The novel copolymers thus prepared are usually solvolyzed after cooling to lower temperatures, for example to room temperature, or preferably in the form of the melt, which is at from 80 to 180° C., preferably from 90 to 150° C. In the simplest case, the solvolysis of the anhydride groups of the copolymers comprises a hydrolysis followed by neutralization. It is particularly advantageous to employ pressure-resistant apparatuses and to convert the anhydride groups into carboxyl groups therein directly by adding water to a melt of the copolymers obtainable in the mass polymerization and to neutralize at least 10% of all carboxyl groups present in the polymer by subsequently adding base. However, hydrolysis and neutralization may also be effected virtually simultaneously by adding dilute aqueous bases to the copolymer melt. The amounts of water and of neutralizing agent are chosen so that emulsions or solutions having a solids content of preferably from 10 to 70, in particular from 20 to 60, % by weight are formed and can be put on the market. Preparation solutions are then produced therefrom by dilution to solids contents of from 0.5 to 70, in particular from 1 to 60, especially from 3 to 35, % by weight.

The copolymers obtainable by mass polymerization can also be solvolyzed by adding primary and/or secondary amines. The solvolysis is carried out using amounts of amines such that from 10 to 50% of the carboxyl groups formed altogether from the amounts of polymerized dicarboxylic anhydrides are amidated. After formation of semiamide groups in the copolymer, the neutralization is carried out. It is continued until at least 10% of the carboxyl groups of the copolymer obtained in the mass polymerization are neutralized. Solvolysis may also be effected with aminocarboxylic acids and salts of aminocarboxylic acids, preferably the alkali metal salts. Alkali metal salts of a-aminocarboxylic acids are particularly preferably used, the alkali metal salts of sarcosine being very particularly advantageous.

The solvolysis by means of salts of aminocarboxylic acids is advantageously carried out in an aqueous medium. The solvolysis is effected using amounts of aminocarboxylates such that from 10 to 50% of the carboxyl groups formed altogether from the polymerized dicarboxylic anhydride units are esterified. Neutralization in which. at least 10% of the carboxyl groups formed altogether from the anhydride-containing copolymer are neutralized is then carried out.

Preferably, from 25 to 50% of the carboxyl groups formed altogether from the polymerized dicarboxylic anhydrides are amidated or esterified. Examples of suitable neutralizing agents are ammonia, amines, eg. triethylamine, tributylamine or triethanolamine, alkali metal and alkaline earth metal bases, eg. sodium hydroxide solution, potassium hydroxide solution, magnesium hydroxide, calcium hydroxide or barium hydroxide, and all amines which are also used for the amidation of the copolymers. The neutralization is preferably effected by adding aqueous sodium hydroxide solution to the copolymer. The neutralization of the anhydride-containing copolymers is carried out at least to such a degree that water-dispersible copolymers are obtained. This degree of neutralization corresponds to at least 2%, in particular at least 10%, of the carboxyl groups formed altogether from the anhydride groups. The degree of neutralization is furthermore dependent on the chain length of the particular branched olefin used and on the structure of any comonomers used from group (c).

Ammonia and primary and secondary amines can be used for amide formation. The amide formation is preferably effected in the absence of water, by reacting the anhydride groups of the copolymer with ammonia or the amines. The suitable primary and secondary amines may have from 1 to 40, preferably from 3 to 30, carbon atoms. Examples of suitable amines are methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di-tallow fatty amine, distearylamine, dioleylamine, ethanolamine, diethanolamine, n-propanolamine, di-n-propanolamine and morpholine. Morpholine is preferably used.

By choosing suitable reaction conditions, it is possible to produce imide structures from the dicarboxylic anhydride units of the copolymer using ammonia or primary amines. These imide-functionalized copolymers can be converted into an aqueous emulsion or solution similarly to the esterified or amidated copolymers.

To partially esterify the anhydride-containing copolymers obtained in the mass polymerization, said copolymers are reacted with alcohols. The esterification, too, is preferably carried out in the absence of water. Suitable alcohols may be of 1 to 40, preferably 3 to 30, carbon atoms. Primary, secondary and tertiary alcohols may be used.

Both saturated aliphatic alcohols and unsaturated alcohols, for example oleyl alcohol, may be employed. Monohydric, primary or secondary alcohols, eg. methanol, ethanol, n-propanol, isopropanol, n-butanol, isobutanol, n-pentanol and isomers, n-hexanol and isomers, n-octanol and isomers, eg. 2-ethylhexanol, nonanols, decanols, dodecanols, tridecanols, cyclohexanol, tallow fatty alcohol, stearyl alcohol and the alcohols or alcohol mixtures of 9 to 19 carbon atoms which are readily obtainable industrially by the oxo synthesis, for example $C_{9/11}$-oxo alcohol, $C_{13/15}$-oxo alcohol and Ziegler alcohols, which are known, for example, under the name Alfols®, of 12 to 24 carbon atoms, are preferably used. Alkoxylated alcohols, such as fatty alcohol ethoxylates or propoxylates, oxo alcohol ethoxylates or propoxylates, polyethylene glycols, polypropylene glycols or ethylene oxide/propylene oxide block copolymers, may also be used.

Alcohols of 4 to 24 carbon atoms, eg. n-butanol, isobutanol, amyl alcohol, 2-ethylhexanol, tridecanol, tallow fatty alcohol, stearyl alcohol, $C_{9/11}$-oxo alcohol, $C_{13/15}$-oxo alcohol, $C_{12/14}$-Alfols and $C_{16/18}$-Alfols are preferably used.

After the partial conversion of the anhydride groups into semiamide or half-ester groups, further anhydride groups of the polymer which are still present are hydrolyzed. The hydrolysis of said anhydride groups can also be carried out simultaneously with the partial neutralization still required, by adding an aqueous base to the partially amidated or esterified copolymer still containing anhydride groups. In order to accelerate the hydrolysis of the anhydride groups, a suitable catalyst may also be added, for example a pyridine derivative, such as 4-dimethylaminopyridine. On the other hand, a certain proportion of unhydrolyzed dicarboxylic anhydride groups may also remain in the aqueous formulation. In the hydrolysis of the anhydride groups, the amount of water and base is chosen so that the concentration of the emulsion or of the solution of the copolymer is preferably from 20 to 55% by weight. The pH of the ready-to-use compositions, for example for retanning, fatliquoring or water repellent treatment, is from about 4 to 10.

The resulting aqueous emulsions or solutions of the copolymer are stable and have a long shelf life. They are very useful for the treatment of leather and skins because they also have particularly good penetration properties in addition to particularly pronounced water repellent, fatliquoring and retanning action. The leather and skin material treated with these copolymer emulsions or solutions exhibits only slight water absorptivity and water permeability. The novel emulsions or solutions impart good body and high tensile strength and tongue tear strength, so that an additional treatment with commercial retanning agents, for example with vegetable tanning agents or synthetic organic tanning agents (syntans) based on phenolsulfonic acid/phenol/formaldehyde condensates, is no longer necessary in most cases.

Up to 40% by weight, based on the amount of copolymer, of emulsifiers may be mixed with the novel emulsions or solutions in order to prepare a leather fatliquor having further, improved penetration properties. These emulsifier-containing aqueous emulsions or solutions have excellent fatliquoring and plumping effect in combination with very good penetration properties. The emulsifiers used are, for example, alkoxylated fatty alcohols or oxo alcohols, block copolymers of ethyleneoxy and propyleneoxy units, alkoxylated fatty acids, ethoxylated fatty amides, fatty alkanolamides, fatty acid ammonium salts, fatty alcohol phosphates, alkylglucosides, alkylphenol alkoxylates, mono- or diesters of 2-sulfosuccinic acid and N-acylamino acids and mixtures thereof.

The novel emulsions or solutions may furthermore contain protective colloids in amounts of up to 40% by weight, based on the amount of copolymer. These aqueous emulsions or solutions containing protective colloid likewise have an excellent fatliquoring and plumping effect in combination with very good penetration properties. The protective colloids used are, for example, polyvinyl alcohol, degraded starch, modified starches, carboxymethylcellulose, hydroxyethylcellulose and polyvinylpyrrolidone.

The novel aqueous emulsions and solutions may furthermore be used as dispersants for aqueous suspensions of inorganic or organic pigments. For example, aqueous suspensions of cement, calcium sulfate dihydrate, calcium sulfate hemihydrate, fly ash, kaolin, titanium dioxide, calcium carbonate, iron oxide, such as FeO(OH), $Fe_2O_3$ and $Fe_3O_4$, clays, quartz minerals or feldspars can be fluidized using the novel aqueous emulsions or solutions. Furthermore, aqueous suspensions of organic pigments which may contain a certain proportion of. organic solvents can be dispersed using the novel aqueous emulsions or solutions. Examples of suitable organic pigments are phthalocyanine pigments, such as C.I. Pigment Blue 15, diaryl yellow pigments, such as C.I. Pigment Yellow 17, laked BON acid pigments, such as C.I. Pigments 52, β-naphthol pigments, such as C.I. Pigment Orange 5, or Naphthol AS pigments, such as C.I. Pigment Blue 25. The novel aqueous emulsions or solutions are generally used here in amounts of from 0.05 to 10, preferably from 0.1 to 5, % by weight (solids content of the copolymer, based on the aqueous pigment suspension).

The present invention furthermore relates to novel copolymers which are obtainable by copolymerization of
- (a') from 20 to 90 mol % of at least one monoethylenically unsaturated $C_4$–$C_{12}$-dicarboxylic acid or the anhydride thereof with
- (b') from 5 to 80 mol % of at least one oligomer of a linear 1-olefin, the linear 1-olefin being of at least 4 carbon atoms and the oligomer carrying a reactive vinyl or vinylidene group, and
- (c') from 5 to 50 mol % of at least one further monoethylenically unsaturated compound which is copolymerizable with the monomers (a') and (b').

The present invention also relates to novel copolymers which are obtainable by copolymerization of
- (a) from 20 to 95 mol % of at least one monoethylenically unsaturated $C_4$–$C_{12}$-dicarboxylic acid or the anhydride thereof with
- (b") from 5 to 80 mol % of at least one oligomer of a linear 1-olefin, the linear 1-olefin being of at least 7 carbon atoms and the oligomer carrying a reactive vinyl or vinylidene group, and
- (c) from 0 to 50 mol % of at least one further monoethylenically unsaturated compound which is copolymerizable with the monomers (a) and (b").

The number average molecular weight and the weight average molecular weight were determined in the examples below by means of gel permeation chromatography. The eluent used was tetrahydrofuran. The crosslinked polystyrene gels Ultrastyragel® (from Waters) or TSK-HXL (from Tosoh) were used as column material. Calibration was effected using polystyrene standards having a narrow molecular weight distribution (from Polymer Laboratories).

EXAMPLES

Preparation of the Aqueous Copolymer Emulsions
Emulsion 1

1000 g of a propene oligomer (number average molecular weight $M_n$=260 g/mol) were initially taken in a steel reactor equipped for polymerizations and having a stirrer and metering apparatus and were heated to 150° C. while stirring in a gentle nitrogen stream. As soon as this temperature had been reached, 377 g of maleic anhydride heated to 70° C. were added uniformly and, separately from this, 13.8 g of di-tert-butyl peroxide were added in the course of 4 hours. Thereafter, the reaction mixture was stirred for 2 hours at 150° C. and cooled to 90° C. while stirring. 4440 g of a 2.08% strength by weight aqueous sodium hydroxide solution at 90° C. were then added in the course of half an hour. The reaction mixture was stirred for 4 hours at from 90 to 95° C. and then cooled to ambient temperature. A low-viscosity aqueous emulsion having a solids content of 22.6% by weight was obtained in this manner. The number average molecular weight of the unhydrolyzed polymer of propene oligomer and maleic anhydride was determined by means of gel permeation chromatography (tetrahydrofuran solvent, polystyrene standard): Mn=1690, Mw=8500.

Emulsion 2

840 g of a hexene oligomer (number average molecular weight $M_n$=280 g/mol) were initially taken in a steel reactor equipped for polymerizations and having a stirrer and metering apparatus and were heated to 150° C. while stirring in a gentle nitrogen stream. As soon as this temperature had been reached, 294 g of maleic anhydride heated to 70° C. were added uniformly and, separately from this, 11.3 g of di-tert-butyl peroxide were added in the course of 6 hours. Thereafter, the reaction mixture was stirred for 1 hour at 150° C. and cooled to 90° C. while stirring. 3383 g of a 2.13% strength by weight aqueous sodium hydroxide solution at 90° C. were then added in the course of half an hour. The reaction mixture was stirred for 4 hours at from 90 to 95° C. and then cooled to ambient temperature. A low-viscosity aqueous emulsion having a solids content of 23.5% by weight was obtained in this manner. The number average molecular weight of the unhydrolyzed polymer of hexene oligomer and maleic anhydride was determined by means of gel permeation chromatography (tetrahydrofuran solvent, polystyrene standard): $M_n$=1740, $M_w$=6200.

Emulsion 3

884 g of a decene oligomer (number average molecular weight $M_n$=340 g/mol) were initially taken in a steel reactor equipped for polymerizations and having a stirrer and metering apparatus and were heated to 150° C. while stirring in a gentle nitrogen stream. As soon as this temperature had been reached, 255 g of maleic anhydride heated to 70° C. were added uniformly and, separately from this, 11.4 g of di-tert-butyl peroxide were added in the course of 4.5 hours. Thereafter, the reaction mixture was stirred for 1 hour at 150° C. and cooled to 90° C. while stirring. 3400 g of a 1.84% strength by weight aqueous sodium hydroxide solution at 90° C. were then added in the course of half an hour. The reaction mixture was stirred for 4 hours at from 90 to 95° C. and then cooled to ambient temperature. A low-viscosity aqueous emulsion having a solids content of 23.8% by weight was obtained in this manner. The number average molecular weight of the unhydrolyzed polymer of decene oligomer and maleic anhydride was determined by means of gel permeation chromatography (tetrahydrofuran solvent, polystyrene standard): $M_n$=1710, $M_w$=5600.

Application Tests on Leather

Starting material: chrome-tanned cattle wet-blue
Shaved thickness: 1.8 mm
(stated percentages are based on shaved weight)

| | | | |
|---|---|---|---|
| Washing: | 200.0% | Water 40° C. discharge liquor | 10 min |
| Neutralization: | 75.0% | Water 35° C. | 120 min |
| | 1.5% | Sodium formate | |
| | 1.0% | Sodium bicarbonate pH of liquor: 5.0 Cut (BKG): uniform Discharge liquor | |
| Washing: | 200.0% | Water 35° C. Discharge liquor | 10 min |
| Retanning: (with 2% of active ingredient) | 100.0% | Water 45° C. | |
| Test A1, B1: | 8.8% | Emulsion 1 (22.6% strength) | 40 min |
| Test A2, B2: | 8.5% | Emulsion 2 (23.5% strength) | 40 min |
| Test A3, B3: | 8.4% | Emulsion 3 (23.6% strength) | 40 min |
| Test A4, B4: | 6.7% | conventional polymer | 40 min |
| | 0.2% | tanning agent based on polymethacrylate (Regulan ® SE from BASF AG, 30% strength) 25% strength ammonia | 5 min |
| Dyeing: | 2.0% | conventional metal complex dye | 30 min |
| Fatliquoring: Tests A1–A4 | 8.0% | conventional water repellent based on paraffin | 60 min |
| alternatively: Tests B1–B4 | 6.0% | conventional silicone- and paraffin-containing | 80 min |

| | | -continued | |
|---|---|---|---|
| | | water repellent | |
| Acidification | 1.5% | 85% strength formic acid | 2 × 10 min +20 min |
| | | Discharge liquor | |
| Washing: | 200.0% | Water 40° C. | 10 min |
| | | Discharge liquor | |
| Fixing: | 100.0% | Water 30° C. | 90 min |
| | 3.0% | Conventional chrome tanning agent, (basicity 40%, 25% calculated as $Cr_2O_3$) | |
| | | Discharge liquor | |
| Washing: | 200.0% | Water 25° C. | 10 min |
| | | Discharge liquor | |
| | | Leather overnight on horse, set out, vacuum 2 min/80° C., drying in festoon drier, conditioning, staking, kiss-plate | |

The leathers obtained using emulsion 1 (test A1, B1) had a full, soft handle, were uniformly dyed and gave very good results in the dynamic tests for testing the quality of the water repellency (see below).

The leathers obtained using emulsion 2 (test A2, B2) had a round, soft handle, were uniformly dyed and gave very good results in the dynamic tests for testing the quality of the water repellency (see below).

The leathers obtained using emulsion 3 (test A3, B3) were very firm with a slightly waxy handle, were uniformly dyed and gave very good results in the dynamic tests for testing the quality of the water repellency (see below).

The leathers obtained for comparison using emulsion 4 (test A4, B4) were firm, had a round handle and were uniformly dyed. The results in the dynamic tests for water resistance are shown in the table below.

The leathers obtained according to test series B were all generally somewhat softer compared with those of series A and had a slightly velvety handle.

Test results for water repellency:

| | Bally penetrometer (15% compression) | | |
|---|---|---|---|
| Test No. | Water penetration after | Water absorption after 24 hours | Maeser test |
| A1 | >24 hours | 24% by weight | 23000 |
| A2 | >24 hours | 27% by weight | 32000 |
| A3 | 15 hours | 24% by weight | 15000 |
| A4 | 15 hours | 29% by weight | 2000 |
| B1 | >24 hours | 22% by weight | 30000 |
| B2 | >24 hours | 23% by weight | >50000 |
| B3 | >24 hours | 22% by weight | 25000 |
| B4 | >24 hours | 25% by weight | 9000 |

We claim:

1. A process for treating leather and skins, comprising contacting a leather or a skin with an aqueous copolymer solution or aqueous copolymer emulsion of a copolymer which is obtained by copolymerization of
   (a) from 20 to 95 mol % of at least one monoethylenically unsaturated $C_4$–$C_{12}$-dicarboxylic acid or the anhydride thereof with
   (b) from 5 to 80 mol % of at least one branched oligomer or polymer which has a vinyl, vinylidene or alkylvinylene terminal group and is of at least 9 carbon atoms, and which is obtained by oligomerization or polymerization of an olefin or mixture of olefins, wherein when the olefin is ethylene, ethylene is present in admixture with another olefin, and wherein said olefins are unsubstituted or substituted with one or more of amino, hydroxyl, carboxyl, carboxylester, aryl, further C—C double bonds, or cyclic saturated or unsaturated alkyl radicals, and
   (c) from 0 to 50 mol % of at least one further monoethylenically unsaturated compound other than monomers (a) or (b) which is copolymerizable with the monomers (a) and (b), and which is selected from the group consisting of linear 1-olefins; monoethylenically unsaturated monocarboxylic acids; vinyl and allyl alkyl ethers, wherein the alkyl group is optionally substituted; alkyl esters, hydroxyalkyl esters, alkoxyalkyl esters, amides and N-alkyl amides of monoethylenically unsaturated monocarboxylic acids or dicarboxylic acids; vinyl and allyl esters of monocarboxylic acids; N-vinylcarboxamides of carboxylic acids; N-vinyl compounds of nitrogen-containing heterocyclic compounds; styrene and styrene derivatives; and mixtures thereof,
containing from 0.5 to 70% by weight, based on the total amount of the solution or emulsion, of this copolymer.

2. The process as claimed in claim 1, in which the copolymer is present in a form in which some or all of its anhydride groups are solvolyzed with compounds having hydroxyl functional groups or with amines and some or all of existing carboxyl groups or of carboxyl groups formed in the solvolysis are neutralized.

3. A process for treating leather and skins, comprising contacting a leather or a skin with an aqueous copolymer solution or aqueous copolymer emulsion of a copolymer which is obtained by copolymerization of
   (a) from 20 to 95 mol % of at least one monoethylenically unsaturated $C_4$–$C_{12}$-dicarboxylic acid or the anhydride thereof with
   (b) from 5 to 80 mol % of at least one branched oligomer or polymer which has a vinyl, vinylidene or alkylvinylene terminal group and is of at least 9 carbon atoms, and which is obtained by oligomerization or polymerization of an olefin or mixture of olefins, wherein when the olefin is ethylene, ethylene is present in admixture with another olefin, and wherein said olefins are unsubstituted or substituted with one or more of amino, hydroxyl, carboxyl, carboxylester, aryl, further C—C double bonds, or cyclic saturated or unsaturated alkyl radicals, and
   (c) from 0 to 50 mol % of at least one further monoethylenically unsaturated compound other than monomers (a) or (b) which is copolymerizable with the monomers (a) and (b), and which is selected from the group consisting of linear 1-olefins of at least 8 carbon atoms; monoethylenically unsaturated monocarboxylic acids; vinyl and allyl alkyl ethers, wherein the alkyl group is optionally substituted; alkyl esters, hydroxyalkyl esters, alkoxyalkyl esters, amides and N-alkyl amides of monoethylenically unsaturated monocarboxylic acids or dicarboxylic acids; vinyl and allyl esters of monocarboxylic acids; N-vinylcarboxamides of carboxylic acids; N-vinyl compounds of nitrogen-containing heterocyclic compounds; styrene and styrene derivatives; and mixtures thereof, containing from 0.5 to 70% by weight, based on the total amount of the solution or emulsion, of this copolymer.

4. The process as claimed in claim 3, in which the copolymer is present in a form in which some or all of its anhydride groups are solvolyzed with compounds having hydroxyl functional groups or with amines and some or all of existing carboxyl groups or of carboxyl groups formed in the solvolysis are neutralized.

* * * * *

UNITED STATES PATENT AND TRADEMARK OFFICE
CERTIFICATE OF CORRECTION

PATENT NO. : 6,336,942 B1
DATED : January 8, 2002
INVENTOR(S) : Danisch et al.

It is certified that error appears in the above-identified patent and that said Letters Patent is hereby corrected as shown below:

<u>Title page,</u>
Item [30], Foreign Application Priority information should read:

-- [30] Foreign Application Priority Data

Mar. 13, 1995   (DE)……………….....195 08 655 --

Signed and Sealed this

Twenty-seventh Day of August, 2002

Attest:

JAMES E. ROGAN
Attesting Officer
Director of the United States Patent and Trademark Office